United States Patent [19]

Yamada et al.

[11] 4,259,456
[45] Mar. 31, 1981

[54] ODORLESS POLYOLEFIN RESIN COMPOSITIONS

[75] Inventors: Hisashi Yamada, Chiba; Kazuo Hayakawa, Tokyo; Masayuki Makise, Chiba, all of Japan

[73] Assignee: The Lion Fat & Oil Co., Ltd., Tokyo, Japan

[21] Appl. No.: 26,191

[22] Filed: Apr. 2, 1979

[30] Foreign Application Priority Data

Sep. 27, 1978 [JP] Japan .................. 53-118866

[51] Int. Cl.³ ........................... C08K 5/29; C08K 5/42
[52] U.S. Cl. ..................................... 525/3; 260/42.16; 260/42.44; 260/42.45; 525/4; 525/6
[58] Field of Search ................ 525/3, 6, 4; 260/42.45, 260/42.16, 42.44

[56] References Cited

U.S. PATENT DOCUMENTS

| | | |
|---|---|---|
| 2,956,982 | 10/1960 | McCall et al. ............................ 525/3 |
| 3,503,843 | 3/1970 | Williams et al. ......................... 525/3 |
| 3,644,310 | 2/1972 | Hopkins .................................. 525/3 |
| 3,668,179 | 6/1972 | Di Biasi et al. ..................... 260/42.45 |
| 3,714,114 | 1/1973 | Stretanski ........................... 260/42.45 |
| 4,080,359 | 3/1978 | Yui et al. ............................. 260/42.45 |

Primary Examiner—John Kight, III
Attorney, Agent, or Firm—Wyatt, Gerber, Shoup, Scobey & Badie

[57] ABSTRACT

An improved odorless polyolefin resin composition is proposed which is free from the problem of the generation of unpleasant odors unavoidable in the conventional polyolefin resin compositions filled with an inorganic filler due to the oxidative degradation of the ingredients. The deodorant effect in the inventive compositions is obtained by formulating limited amounts of a secondary alkane sulfonate having 12 to 20 carbon atoms per molecule and an organic nitrogen compound having at least one skeletal structure expressed by the formula

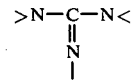

in a molecule as exemplified by melamine and the like into a polyolefin resin-inorganic filler blend.

2 Claims, No Drawings

ODORLESS POLYOLEFIN RESIN COMPOSITIONS

BACKGROUND OF THE INVENTION

The present invention relates to a polyolefin resin composition containing inorganic fillers with no problems of unpleasant odor.

It is well known that polyolefin resins are liable to discoloration and generation of unpleasant odors when they are subjected to oxidative degradation. This phenomenon of oxidative degradation can be prevented, in the case of polyethylene resins, for example, by admixing 2,6-di-tert-butyl-p-cresol (abbreviated as BHT hereinafter) into the resin in an amount of 0.001 to 0.1% by weight. Even when articles of a polyethylene resin are fabricated or put to use under extreme temperature conditions, the addition of low-volatile, high-molecular weight phenolic antioxidants such as [methylene-3-(3′,5′-di-tert-butyl-4′-hydroxyphenyl)propionate]methane and the like is sufficiently effective for preventing the oxidative degradation of the resin. In the case of polypropylene resins, it is a generally accepted practice that the amount of BHT is increased to 0.1 to 1.0% by weight and it is combined with dilaurylthiodipropionate due to the increased tendency toward oxidation at the higher temperatures necessitated for fabrication of the resins.

In recent times, various kinds of inorganic fillers have been incorporated into the polyolefin resins to give a resin composition containing 5 to 80% by weight of the filler with modified or improved properties. One of the major problem in the shaped articles of these filler-incorporated polyolefin resin compositions is their increased tendency toward discoloration and generation of unpleasant odors by the oxidative degradation in comparison with filler-free polyolefin resin compositions. When such a resin composition is exposed to a high temperature atmosphere, in particular, the unpleasant odor is so strong that working environments are heavily polluted during fabrication of the resin compositions by processes such as extrusion molding, injection molding, vacuum forming and the like. They are also defective for the fabrication of table and kitchenware which comes into contact with hot foods or drinks, as well as for containers and wrappings for foods or drinks where the retention of the flavor is of utmost importance.

In the prior art, attempts were made to solve the above described problems in three different ways. The first of them is the careful selection of the filler incorporated into the resin composition as is exemplified by the use of talc which gives rise to almost no problem of unpleasant odors. This approach is effective in preventing the unpleasant odor but such effectiveness is achieved only with talc of very specific grade with limitations in the origin, chemical composition and shape of the particles. The procedure is not applicable to inorganic fillers of other types.

The second of the three ways is the pretreatment of the inorganic filler with a base to achieve and acid value (Lewis acid) higher than 3.3. The thus treated filler is incorporated into the selected polyolefin resin composition containing a phenolic antioxidant with the result that the unpleasant odor is effectively prevented. Although this method is effective in preventing unpleasant odors, it is not attractive industrially because of the necessity for the surface treatment of the inorganic filler either in a wet process or a dry process prior to the blending step increases the production cost.

The third of the three ways depends largely on the use of additives such as an antioxidant and the like as a deodorant. This approach is presently under active investigations because of the simplicity of the process and the versatility for a wide variety of inorganic fillers. Typical examples of the formulations employed in this method are the addition of 0.01 to 5 parts by weight of distearylpentaerithritol diphosphite into 100 parts by weight of a blend of a polyolefin resin and an inorganic filler and a further admixing of 0.01 to 5 parts by weight of tetrakis[methylene-3-(3′,5′-di-tert-butyl-4′-hydroxyphenyl)propionate]methane or 1,3,5-tris(3′5′-di-tert-butyl-4′-hydroxybenzyl)-2,4,6-trimethylbenzene to the above blend with distearylpentaerithritol diphosphite. The effectiveness of this method for preventing unpleasant odors is limited, however, so that it is unsatisfactory from a practical viewpoint. Other methods following this third approach are all unsatisfactory for preventing unpleasant odors. These include the addition of higher fatty acids or metal salts thereof, glycerin esters of higher fatty acids and the like.

SUMMARY OF THE INVENTION

Thus, an object of the present invention is to provide a solution of the problem of unpleasant odors in polyolefin resin compositions filled with an inorganic filler. In accordance with the invention it has been discovered that there is obtained, by formulating the resin composition with a combination of a specific surface active agent and an organic compound having at least one skeletal structure expressed by the formula

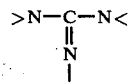

in a molecule, a polyolefin resin composition with markedly decreased odors in comparison with any of the conventional similar resin compositions.

More specifically the odorless polyolefin resin composition of the present invention comprises (a) from 0.01 to 2 parts by weight of a secondary alkane sulfonate of which the average number of carbon atoms in the alkyl group is from 12 to 20 and (b) from 0.01 to 1 part by weight of an organic compound having at least one skeletal structure expressed by the formula

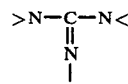

in a molecule, each per 100 parts by weight of a blend composed of 20 to 95% by weight of a polyolefin resin and 5 to 80% by weight of an inorganic filler.

DETAILED DESCRIPTION OF THE PREFERRED EMBODIMENTS

The polyolefin compositions of the invention are, as described above, based on polyolefin resins filled with at least an inorganic filler in a weight ratio of resin to filler in the range from 20:80 to 95:5. Typically useful filler include for example reinforcing or non-reinforcing fillers of finely divided powders or fibrous materials such as talc, mica, asbestos, glass fibers, rock wool, calcium sulfate, calcium sulfite, calcium carbonate, aluminum hydroxide, magnesium carbonate, barium sulfate, kaolin clay and the like.

The polyolefin resins as the main component in the inventive resin composition include high-density polyethylenes, low-density polyethylenes, atactic or isotactic polypropylenes and copolymers of ethylene and propylene as well as copolymers of these olefins with minor amounts of other copolymerizable monomers such as vinyl acetate, acrylic acid and esters thereof, maleic acid and esters thereof. The invention also includes the like and polymer blends of which the main component, for example, 50% by weight or more, is one or more of the above named olefin polymers.

The deodorant effect in the present invention is obtained with a combination of the above-mentioned components. The alkane sulfonate, as the component (a), is a reaction product of a n-alkane with sulfur dioxide and oxygen in the presence of a free radical initiator, such as a peroxide, or by irradiation with ultraviolet light, to give a sulfonated product which is subsequently neutralized with an alkali such as sodium hydroxide. The alkane sulfonate obtained by the above procedure is conventionally identified as a secondary alkane sulfonate since the sulfonate group, e.g. —SO$_3$Na, is introduced and bonded to the carbon atom not positioned at the terminal of the alkane molecule, viz. a carbon atom at the 2-position or a higher position. In particular, the alkane sulfonate used in the present invention is desirably a long-chained one having 12 to 20 carbon atoms per molecule in an average to give a superior deodorant effect. The secondary alkane sulfonate used in the present invention can be distinguished in various physical and chemical properties from a primary alkane sulfonate where the sulfonate group —SO$_3$Na is bonded to the terminal carbon atom of the alkane. It is produced by a synthetic method different from the above described procedure starting, for example, with a higher alcohol. Additionally, secondary alkane sulfonates exhibit liquid crystal characteristics when examined with a polarizing microscope at room temperature while primary alkane sulfonates do not.

The nitrogen compound used in the present invention as the component (b) in combination with the above secondary alkane sulfonate should have at least one skeletal structure expressed by the formula

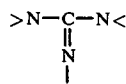

in a molecule. Typical examples include dicyandiamide, melamine, guanidine, phenylmelamine, melam, melem, benzoguanamine, melaniline and the like. Melamine is the most preferred from the standpoint of heat stability, commercial availability and price.

The polyolefin resin compositions of the present invention are, different from conventional polyolefin resin compositions filled with an inorganic filler in that they are free from the problem of the generation of unpleasant odor without the addition of specific deodorant components as described above. The advantages are obtained include preventing the pollution of the working environment of fabrication workers as well as in avoiding the unpleasant odors when the composition is used in association with food or drink.

The following non-limiting examples are given by way of illustration only.

EXAMPLE 1

Resin compositions were prepared by uniformuly blending 50 parts by weight of a polypropylene having a melt index of 1.0 and a density of 0.90 g/cm$^3$, 50 parts by weight of talc and additives as tabulated in Table 1 in the amounts also given in the table by use of a Banbury mixer operating with a discharge temperature of 190° C. The resin compositions were shaped into sheets of 3 mm thickness and pelletized into 3 mm cubes by use of a pelletizing machine.

The thus pelletized compositions were introduced into a non-vent type extruder machine with a cylinder temperature of 210° C. and a die temperature of 200° C. and extruded into 3 mm diameter strands which were then chopped after cooling with water into strand pellets 3.5 mm in length.

The strand pellets, taken out of boiling water after dipping for 3 minutes were immediately evaluated for odor and recorded to give the results as set out in Table 1.

The symbols A to H in Table 1 stand for the additives below, respectively.
A: stearic acid
B: stearic acid monoglyceride
C: calcium stearate
D: 2,6-di-tert-butyl-p-cresol
E: tetrakis[3-(4'-hydroxy-3',5'-di-tert-butylphenyl)-propionyloxymethyl]methane
F: distearylpentaerithritol diphosphite
G: sodium salt of a secondary alkane sulfonate with 14 carbon atoms per molecule in an average
H: melamine The rating of the odor was given in five grades 1 to 5, the grade "5" being for the most intense odor and the grade "1" being for the case with almost no odor.

TABLE 1

| Experiment No. | Additive (parts by weight) | Rating of odor |
|---|---|---|
| 1 | None | 5 |
| 2 | A (1) | 4 |
| 3 | B (1) | 4 |
| 4 | C (1) | 4 |
| 5 | D (0.2) + E (0.1) | 4 |
| 6 | F (0.3) | 3 |
| 7 | F (0.3) + E (0.1) | 3 |
| 8 | G (0.5) + H (0.2) | 1 |

It is evident from the tabulated results above that the result in Experiment No. 8 according to the present invention is much better in preventing generation of unpleasant odor than in Experiments No. 1 to No. 7 undertaken for comparative purpose with conventional formulations.

EXAMPLE 2

The experimental procedure was the same as in Example 1 except that the resin compositions were prepared by formulating a blend of 50 parts by weight of a polypropylene having a melt index of 2.0 and a density of 0.90 g/cm$^3$ and 50 parts by weight of talc with an average particle diameter of about 6 μm with a surface active agent alone or with a combination of a surface active agent and melamine as indicated in Table 2 below, which summarizes the experimental data. The meanings of the abbreviations for the surface active agents are as follows.

LAS: a linear-chain alkylbenzene sulfonate with the number of carbon atoms of the alkyl groups indicated in the brackets PSAS: sodium salt of a primary alkane sulfonate with the number of carbon atoms in the alkane molecule as indicated in the brackets SSAS: sodium salt of a secondary alkane sulfonate with the number of carbon atoms in the alkane molecule as indicated in the brackets ADBAC: alkyldimethylbenzylammonium chloride n-ODA: n-octadecylamine BANMS: benzoic acid N-methylstearylamide

TABLE 2

| Experiment No. | Surface active agent, parts by weight added | Melamine, parts by weight added | Rating of odor |
|---|---|---|---|
| 9 | Soap, 0.5 | 0 | 5 |
| 10 |  | 0.2 | 5 |
| 11 | LAS (8–12), 0.5 | 0 | 5 |
| 12 |  | 0.2 | 5 |
| 13 | LAS(12–20), 0.5 | 0 | 5 |
| 14 |  | 0.2 | 5 |
| 15 | LAS(22–28), 0.5 | 0 | 5 |
| 16 |  | 0.2 | 5 |
| 17 | PSAS(8–12), 0.5 | 0 | 5 |
| 18 |  | 0.2 | 5 |
| 19 | PSAS(12–20), 0.5 | 0 | 5 |
| 20 |  | 0.2 | 5 |
| 21 | PSAS(22–28), 0.5 | 0 | 5 |
| 22 |  | 0.2 | 5 |
| 23 | SSAS(8–12), 0.5 | 0 | 4 |
| 24 |  | 0.2 | 3 |
| 25 | SSAS(12–20), 0.5 | 0 | 4 |
| 26 |  | 0.2 | 1 |
| 27 | SSAS(22–28), 0.5 | 0 | 4 |
| 28 |  | 0.2 | 3 |
| 29 | ADBAC, 0.5 | 0 | 5 |
| 30 |  | 0.2 | 5 |
| 31 | n-ODA, 0.5 | 0 | 5 |
| 32 |  | 0.2 | 5 |
| 33 | BANMS, 0.5 | 0 | 5 |
| 34 |  | 0.2 | 5 |

EXAMPLE 3

The experimental procedure was the same as in Example 1 except that the resin compositions were prepared by blending 60 parts by weight of a high-density polyethylene with a melt index of 0.4 and a density of 0.955 g/cm$^3$, 40 parts by weight of an inorganic filler as indicated in Table 3 below, 0.5 part by weight of sodium salt of a secondary alkane sulfonate with 12–20 carbon atoms in a molecule and 0.5 part by weight each of one or two additives A to H or guanidine as indicated in the table. The results are shown in Table 3.

In the table, the symbols A to H for the additives have the same meanings as in Example 1 and the inorganic fillers appearing in the table have the characteristics as below.

Talc A: average particle diameter 7 μm
Talc B: average particle diameter 6 μm
Glass fiber: diameter 10 μm and chopped in 7 mm length
Kaolin clay: average particle diameter 2 μm
Heavy calcium carbonate: average particle diameter 5 μm

TABLE 3

| Experiment No. | Inorganic filler | Additive | Rating of odor |
|---|---|---|---|
| 35 | Talc A | None | 5 |
| 36 |  | B | 4 |
| 37 |  | D | 4 |
| 38 |  | E | 4 |
| 39 | Talc B | F | 3 |
| 40 |  | F + E | 3 |
| 41 |  | H | 1 |
| 42 |  | Guanidine | 1 |
| 43 |  | None | 4 |
| 44 | Glass fiber | F | 4 |
| 45 |  | H | 1 |
| 46 |  | None | 5 |
| 47 |  | C | 4 |
| 48 | Kaolin clay | F | 4 |
| 49 |  | H | 1 |
| 50 |  | None | 4 |
| 51 | Heavy calcium carbonate | A | 4 |
| 52 |  | D | 4 |
| 53 |  | H | 1 |

EXAMPLE 4

The experimental procedure was the same as in Example 1 except that the resin compositions were prepared by blending 60 parts by weight of a copolymer of ethylene and propylene with a melt index of 2.0 and a density of 0.91 g/cm$^3$, 40 parts by weight of a kaolin clay with an average particle diameter of 2 μm, 0.001 to 5 parts by weight of sodium salt of a secondary alkane sulfonate with 14 carbon atoms in a molecule (abbreviated as Na-AS hereinafter) and 0.001 to 5 parts by weight of melamine. The experimental results are shown in Table 4 below.

TABLE 4

| Experiment No. | Na-AS, parts by weight | Melamine, parts by weight | Rating of odor |
|---|---|---|---|
| 54 | 0.5 | 0.001 | 4 |
| 55 | 0.5 | 0.005 | 4 |
| 56 | 0.5 | 0.01 | 1 |
| 57 | 0.5 | 0.05 | 1 |
| 58 | 0.5 | 0.5 | 1 |
| 59 | 0.5 | 1 | 1 |
| 60 | 0.5 | 2 | 3 |
| 61 | 0.001 | 0.2 | 4 |
| 62 | 0.005 | 0.2 | 4 |
| 63 | 0.01 | 0.2 | 1 |
| 64 | 0.1 | 0.2 | 1 |
| 65 | 1 | 0.2 | 1 |
| 66 | 2 | 0.2 | 1 |
| 67 | 3 | 0.2 | 3 |
| 68 | 5 | 0.2 | 3 |

What is claimed is:

1. An odorless polyolefin resin composition which comprises (a) from 0.01 to 2 parts by weight of a secondary alkane sulfonate alkali metal salt having from 12 to 20 carbon atoms per alkyl group and (b) from 0.01 to 1 part by weight of an organic nitrogen compound having at least one skeletal structure expressed by the formula

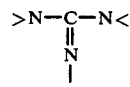

in a molecule, per 100 parts by weight of a blend composed of from 20 to 95% by weight of a polyolefin resin and from 80 to 5% by weight of an inorganic filler.

2. The polyolefin resin composition as claimed in claim 1 wherein the organic nitrogen compound is melamine.

* * * * *